Figure 2:
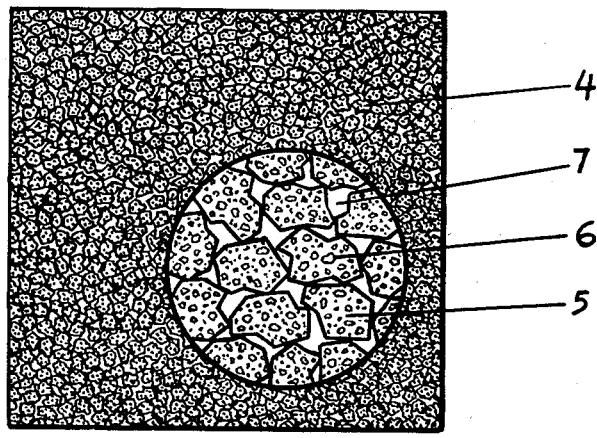

March 16, 1954  C. C. BALKE  2,671,953
METAL BODY OF HIGH POROSITY
Filed July 23, 1948

CLAIRE C. BALKE
INVENTOR.
BY George F. Mueller

Patented Mar. 16, 1954

2,671,953

UNITED STATES PATENT OFFICE 2,671,953

METAL BODY OF HIGH POROSITY

Claire C. Balke, Drexel Hill, Pa., assignor to Fansteel Metallurgical Corporation, North Chicago, Ill., a corporation of New York Application July 23, 1948, Serial No. 40,409

6 Claims. (Cl. 29—182)

This invention relates to highly porous bodies formed of silver alloys and to a method of preparing such bodies.

In my co-pending application, Serial No. 40,407, filed July 23, 1948, there is disclosed highly porous silver bodies and methods of preparing such bodies. These highly porous bodies are particularly adapted for use in filtration problems and also may be employed for introducing gases into or distributing gases in liquids or in other gases.

The principal purpose of the present invention is to provide highly porous bodies of silver alloys.

A further object of this invention is to provide highly porous silver alloy bodies having a specific structure with respect to the porosity.

Another object of this invention is to provide highly porous silver bodies having higher mechanical strength and higher degree of hardness than substantially pure silver bodies.

Other objects and advantages of this invention will become apparent from the following description and claims.

As described in my co-pending application, porous silver bodies may be formed by adding an extraneous material to silver powder, pressing the mixture at a relatively low pressure to form a self-supporting compact, and heating to sublime or volatilize the extraneous material and to sinter the silver particles. Bodies made in accordance with this method may have a porosity as high as 85%. The degree of porosity will be dependent upon the particle size of the materials, the amount of extraneous material added to the silver powder, the pressures employed in forming the compacts and the heating and sintering schedule.

The bodies made by this method when silver or fine silver powder is employed, are extremely soft and do not possess mechanical and physical properties required for many purposes. As is well known, copper when added to silver in amounts up to about 10% increase appreciably the mechanical strength and hardness of the silver. Such silver-copper alloys also have precipitation or age hardening characteristics.

The most feasible method for the production of highly porous silver bodies consists of mixing an extraneous or sublimable material, for example, ammonium acid carbonate, with the silver powder and pressing the mixture into compacts at relatively low pressures, for example, at pressures of about 5 tons per square inch. The compacts are then heated in air to a temperature of about 200° C. to expel the ammonium acid carbonate and the temperature subsequently raised to about 550° C. to sinter the particles together.

Considerable difficulty is encountered when copper powder or copper flake is added to a mixture of silver powder and ammonium acid carbonate unless the entire mass is utilized immediately. At room temperatures, the ammonium acid carbonate dissociates or decomposes into ammonia gas, water vapor and carbon dioxide. This dissociation or decomposition is a reversible reaction and if no material is present capable of reacting with the products of dissociation, equilibrium is established. When free copper is present the water vapor and carbon dioxide will react with the copper and the mass soon appears to have been dampened, becomes sticky and will not flow properly in a die. Since the products of dissociation are removed by this reaction, further amounts of ammonium acid carbonate dissociate and in a few days the mass cannot be utilized for the intended purposes. The progress of this dissociation and reaction may be observed by a color change of the mass which takes on a bluish-green color.

I have discovered that a satisfactory mixture containing copper may be prepared by mixing silver powder, ammonium acid carbonate and a copper salt which will not react with the products of the dissociation of the ammonium acid carbonate. The most convenient salt is basic copper carbonate having the formula $CuCO_3 \cdot Cu(OH)_2$. The amount of copper salt added to the mixture is based upon the amount of copper desired in the finished alloy. The amount of ammonium acid carbonate added is dependent upon the porosity desired. This mixture may be stored indefinitely with no adverse effects upon the flow characteristics of the mass.

In the preparation of these highly porous bodies, the ingredients are thoroughly mixed in the desired relative portions. As pointed out, if copper powder or copper flake is employed, it is necessary that the powder mixture be employed promptly to prevent the reaction between the copper and decomposition products of ammonium acid carbonate to proceed to the point where the mass appears dampened. The powder mass is pressed into the desired shape at a pressure at about 5 tons per square inch. The pressure, of course, may be varied to suit individual conditions. The higher the pressure used in forming the compact, the lower the final degree of porosity. In order to aid the formation of the compact, suitable lubricants may be added to the powder mix in accordance with conventional practice. One such lubricant which has been found very satisfactory for the preparation of bodies of this invention is a synthetic wax, marketed under the trade name Acrawax. The lubricant, if employed, should be of such nature that it may be volatilized at relatively low temperatures and will not leave a residue.

The compacts are then heated in a reducing atmosphere, for example, in an atmosphere of cracked ammonia gas, to a temperature of between about 200° C. and about 300° C. to expel the ammonium acid carbonate. After this extraneous material has been removed, the temperature is raised. In those instances where the compact contains the copper in the form of free copper, the temperature is raised to about 825° C. whereby the copper is absorbed by or becomes alloyed with the silver. For compacts containing the copper in the form of a copper salt, the temperature is raised to a point at which the copper salt is reduced to metallic copper. In the case of the basic copper carbonate, a temperature of about 780° C. is satisfactory for this reduction step. The temperature is subsequently raised above 780° C., for example, to a temperature of about 825° C. to permit absorption or alloying of the copper with the silver. Since this heat treatment has been conducted in a reducing atmosphere, hydrogen is present and the material is quite brittle. The compacts are subsequently heated to about 500° C. in air to remove the hydrogen.

The compacts after the first heat treatment whereby the ammonium acid carbonate is expelled, possess a porosity of about 5% higher than the porosity of the compacts after the final heat treatment. This reduction in porosity is due to the shrinkage occurring during the higher temperature heat treatment.

The physical and mechanical properties and characteristics of the porous bodies may be altered and controlled by various treatments. If desired, the compacts may be quenched in water from a temperature of about 825° C. The bodies may subsequently be age hardened by heating to temperatures of between about 350° C. to about 400° C. for from 4 to 5 hours.

Figure 1:
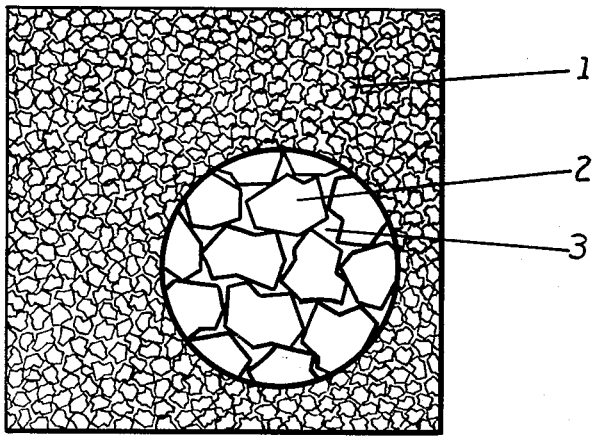

The structure of the highly porous metal bodies made by the foregoing method is illustrated in Fig. 1. The body 1 consists of a plurality of silver copper alloy particles 2 sintered into a coherent mass. The porosity of the body is attributable to the voids or interstices 3 between the particles.

Bodies having similar and higher degrees of porosity but of a different structure may be formed by an alternative method. In this alternative method, the powder mixture containing copper or a copper salt is pressed into a bar or rod or into pellets, the pellets having a diameter of up to about 0.1 inch. If a bar or rod has been formed, it is subjected to the same heat treatments as described above and the porous bar is reduced to chips or granules. If the small pellets have been formed of the powder mixture, they are subjected to the heat treatments to form porous pellets. The porous chips or pellets are then pressed into the desired shape and form or, in the preparation of the very highly porous bodies, they may be tamped in a thin-walled form. The pressed mass is then heated to sinter together the particles forming the chips or the pellets and to sinter together the pellets.

The structure of bodies made by this alternative method is illustrated in Fig. 2. The body 4 consists of a plurality of silver copper alloy particles 5 sintered into a coherent mass. Each of the particles 5 contains voids or interstices 6 which render the particles porous. Further porosity is imparted to the body 4 by the voids or interstices 7 between the porous particles 5. The body thus consists of porous particles 5 permanently joined into a coherent mass with irregular interstices 7 between the porous particles.

The invention may be illustrated by the following specific examples:

Example I

Silver powder, ammonium acid carbonate, copper flake and a commercial lubricant were thoroughly mixed in a ball mill in the proportions as follows:

| | Pts. |
|---|---|
| Silver | 415 |
| Ammonium acid carbonate | 85 |
| Copper flake | 9 |
| Acrawax | 7 |

The silver powder was of a particle size so that substantially all of the powder passed through a 325 mesh screen. The ammonium acid carbonate was of a particle size so that it passed through a 30 mesh screen but was retained on a 65 mesh screen. The amount of copper is sufficient so that the finished body contains 2% copper.

The powder mixture was pressed at about 5 tons per square inch to form the desired compacts. The compacts were then heated in an atmosphere of cracked ammonia gas to a temperature of between 200° C. and 300° C. to remove the ammonium acid carbonate and the lubricant. The temperature was then raised to about 825° C. to permit an alloying of the copper and silver and to sinter the mass into a coherent body. The compacts were subsequently heated in air to a temperature of between 500° C. and 550° C. to remove the hydrogen. The finished compacts had a porosity of approximately 60%.

Example II

Silver powder, ammonium acid carbonate, basic copper carbonate and Acrawax were mixed to form bodies containing approximately 2% copper, 5% copper and 8% copper. The silver powder and ammonium acid carbonate were of the same particle size as the material of Example I. The relative proportions of the ingredients were as follows:

| Material | 2% (2.05) | 5% (4.96) | 8% (8.22) |
|---|---|---|---|
| | Pts. | Pts. | Pts. |
| Silver | 385 | 385 | 385 |
| Ammonium acid carbonate | 115 | 115 | 115 |
| Basic copper carbonate | 14 | 35 | 60 |
| Acrawax | 8 | 8 | 8.5 |

Compacts were formed by pressing the various mixtures at about 5 tons per square inch. The compacts were heated in an atmosphere of cracked ammonia gas to a temperature of between 200° C. and 300° C. to expel the ammonium acid carbonate and the lubricant. The temperature was then raised to between 780° C. and about 800° C. to reduce the basic copper carbonate to copper. The temperature was subsequently raised to about 825° C. to permit absorption or alloying of the copper with the silver and to sinter the body. The compacts were subsequently heated in air to a temperature between 500° C. and 550° C. to remove the hydrogen. The finished bodies had a porosity of approximately 65%.

In the foregoing examples, the porous bodies consist of a porous structure of solid or relatively solid particles. Bodies of like degrees of porosity but having a porous structure of porous particles may be formed by the alternative method. A powder mixture may be prepared containing a smaller proportion of ammonium acid carbonate. Such powdered mixture may be pressed into a bar and the bar subjected to the necessary heating steps to provide a porous bar of the silver-copper alloy, for example, a bar having a porosity of between 40% and 50%. The bar is then machined or broken into chips. The powder mixture may also be pressed into pellets, for example, into pellets having a diameter of up to about 0.1 inch, and the pellets subjected to the necessary heat treatments to form porous pellets or particles. These porous chips, pellets, or particles, are then pressed into the desired shape or tamped in a thin-walled form and heated to sinter together the particles into a body of porous particles.

For some purposes, the shape of the desired body may be such that it is difficult or impossible to press the powder into the desired shape. Such bodies must be prepared from a block or bar by a machining operation. The porous bodies of this invention, particularly when the porosity is of the order of 50% and higher, are somewhat fragile and considerable difficulties are encountered in machining operations.

I have found that the porous bodies may be readily machined if they are impregnated with a suitable wax. The wax should not be too soft nor should it be brittle at ordinary temperatures. The wax should have a melting point sufficiently high to prevent appreciable softening due to the heat generated during machining. It should have a vaporization and burning temperature under about 500° C. and should be capable of being volatilized and burned without leaving a residue. Hard commercial waxes commonly used in forming wax models for the investment type process, generally referred to as the lost wax process, have been found very satisfactory. One such commercial wax which has been employed with highly satisfactory results is marketed under the trade name Zophar C-317.

The porous body, for example, a porous body having a porosity of about 65%, is impregnated with a wax of the type described to form a substantially solid body. If it is desired to provide relatively long cylindrical bodies having a protuberance at one end and a cavity in the other end, a large block of porous silver may be prepared and impregnated with the wax. The body may then be readily sawed into blanks of a desired size and turned in a lathe into the required cylindrical size having the protuberance. The cavity is drilled as required.

The body in its desired machined form is subsequently heated to a temperature of about 550° C. in air or a partial vacuum to remove the wax. When such body is heated in air, the wax becomes volatilized and if the temperature is sufficiently high, the wax may burn. The body will first become blackened and after all of the wax has been volatilized and burned, the body again assumes a bright color. This heat treatment has substantially no effect upon the porosity of the body or upon the shape and size of the body.

Bodies of silver alloys may be prepared by the foregoing methods having a porosity of from about 35% to about 85%. The structure of the porous bodies may be a porous structure of relatively solid particles or of porous particles. The bodies may be prepared by pressing the powder into the desired shape and size or by forming blanks and machining the blanks into the desired size and shape. The porosity may be controlled by the particle sizes of the various materials, pressures and sintering conditions in accordance with powder metallurgy practices. Although the forming pressure mentioned specifically is about 5 tons per square inch, this pressure may be varied to suit individual conditions. Pressures of up to 20 or 25 tons per square inch may be used, however, it is obvious that such higher pressures will reduce the porosity of the bodies.

I claim:

1. As a new article of manufacture, a porous body having a porosity of between about 35% and about 85%, the body consisting essentially of up to about 10% copper and the balance silver and being characterized by consisting of porous silver-copper alloy particles permanently joined into a coherent mass with irregular interstices between the porous particles.

2. The method of forming porous bodies consisting essentially of up to about 10% copper and the balance silver and having a porosity exceeding 35% which comprises forming a mixture of silver powder, ammonium acid carbonate and a copper salt which is reducible to copper in a reducing atmosphere at an elevated temperature and which will not react with the products of the dissociation of ammonium acid carbonate, heating the mixture in a reducing atmosphere to a temperature between about 200° C. and about 300° C. to expel the ammonium acid carbonate, heating the resulting material to a temperature above 780° C. to reduce the copper salt to copper, to alloy the copper with the silver and to sinter the resulting material, thereby forming porous silver-copper alloy particles from the aforesaid powder mixture, pressing the said porous particles into the desired shape and sintering the pressed shape to form a body consisting of porous silver-copper alloy particles permanently joined into a coherent mass with irregular interstices between the porous particles of the silver-copper alloy.

3. The method of forming porous bodies consisting essentially of up to about 10% copper and the balance silver and having a porosity exceeding 35% which comprises forming a mixture of silver powder, ammonium acid carbonate and a copper salt which is reducible to copper in a reducing atmosphere at an elevated temperature and which will not react with the products of the dissociation of ammonium acid carbonate, pressing the mixture into a self-supporting compact, heating the compact in a reducing atmosphere to a temperature between about 200° C. and about 300° C. to expel the ammonium acid carbonate, heating the compact to a temperature above 780° C. to reduce the copper salt to copper, to alloy the copper with the silver and to sinter the compact, thereby forming a porous silver-copper alloy compact, comminuting the porous compact to porous alloy particles, pressing the porous alloy particles into the desired shape and sintering the pressed shape to form a body consisting of porous silver-copper alloy particles permanently joined into a coherent mass with irregular interstices between the porous alloy particles.

4. The method of forming porous bodies consisting essentially of up to about 10% copper and the balance silver and having a porosity exceeding 35% which comprises forming a mixture of silver powder, ammonium acid carbonate and basic copper carbonate, pressing the mixture into a self-supporting compact, heating the compact in a reducing atmosphere to a temperature between about 200° C. and about 300° C. to expel the ammonium acid carbonate, heating the compact to a temperature above 780° C. to reduce the copper salt to copper, to alloy the copper with the silver and to sinter the compact, thereby forming a porous silver-copper alloy compact, comminuting the porous compact to porous silver-copper alloy particles, pressing the porous alloy particles into the desired shape and sintering the pressed shape to form a body consisting of porous silver-copper alloy particles permanently joined into a coherent mass with irregular interstices between the porous alloy particles.

5. The method of forming porous bodies consisting essentially of up to about 10% copper and the balance silver and having porosity exceeding 35% which comprises forming a mixture of silver powder, ammonium acid carbonate and a copper salt which is reducible to copper in a reducing atmosphere at an elevated temperature and which will not react with the products of the dissociation of ammonium acid carbonate, pressing the mixture into pellets, heating the pellets in a reducing atmosphere to a temperature between about 200° C. and about 300° C. to expel the ammonium acid carbonate, heating the pellets to a temperature above 780° C. to reduce the copper salt to copper, to alloy the copper with the silver and to sinter the pellets, thereby forming porous silver-copper alloy pellets, pressing the porous silver-copper alloy pellets into the desired shape and sintering the pressed shape to form a body consisting of porous silver-copper alloy particles permanently joined into a coherent mass with irregular interstices between the porous alloy particles.

6. The method of forming porous bodies consisting essentially of up to about 10% copper and the balance silver and having porosity exceeding 35% which comprises forming a mixture of silver powder, ammonium acid carbonate and basic copper carbonate, pressing the mixture into pellets, heating the pellets in a reducing atmosphere to a temperature between about 200° C. and about 300° C. to expel the ammonium acid carbonate, heating the pellets to a temperature above 780° C. to reduce the basic copper carbonate to copper, to alloy the copper with the silver and to sinter the pellets, thereby forming porous silver-copper alloy pellets, pressing the porous silver-copper alloy pellets into the desired shape and sintering the pressed shape to form a body consisting of porous silver-copper alloy particles permanently joined into a coherent mass with irregular interstices between the porous alloy particles.

CLAIRE C. BALKE.

References Cited in the file of this patent

UNITED STATES PATENTS

| Number | Name | Date |
|---|---|---|
| 1,051,814 | Lowendahl | Jan. 28, 1913 |
| 1,761,506 | Williams | June 3, 1930 |
| 1,873,223 | Sherwood | Aug. 23, 1932 |
| 1,988,861 | Thorausch | Jan. 22, 1935 |
| 2,122,053 | Burkhardt | June 28, 1938 |
| 2,153,397 | Sandler | Apr. 4, 1939 |
| 2,181,123 | Drapeau, Jr. | Nov. 28, 1939 |
| 2,200,369 | Klinker | May 14, 1940 |
| 2,447,980 | Hensel | Aug. 24, 1948 |
| 2,450,339 | Hensel | Sept. 24, 1948 |
| 2,553,714 | Lucas | May 22, 1951 |

FOREIGN PATENTS

| Number | Country | Date |
|---|---|---|
| 536,653 | Great Britain | May 22, 1941 |
| 563,511 | Great Britain | Aug. 17, 1944 |